July 2, 1957  T. J. BLACHUT ET AL  2,797,579
MANUALLY OPERABLE APPARATUS FOR STEERING AN OBJECT
Filed Jan. 11, 1954  5 Sheets-Sheet 2
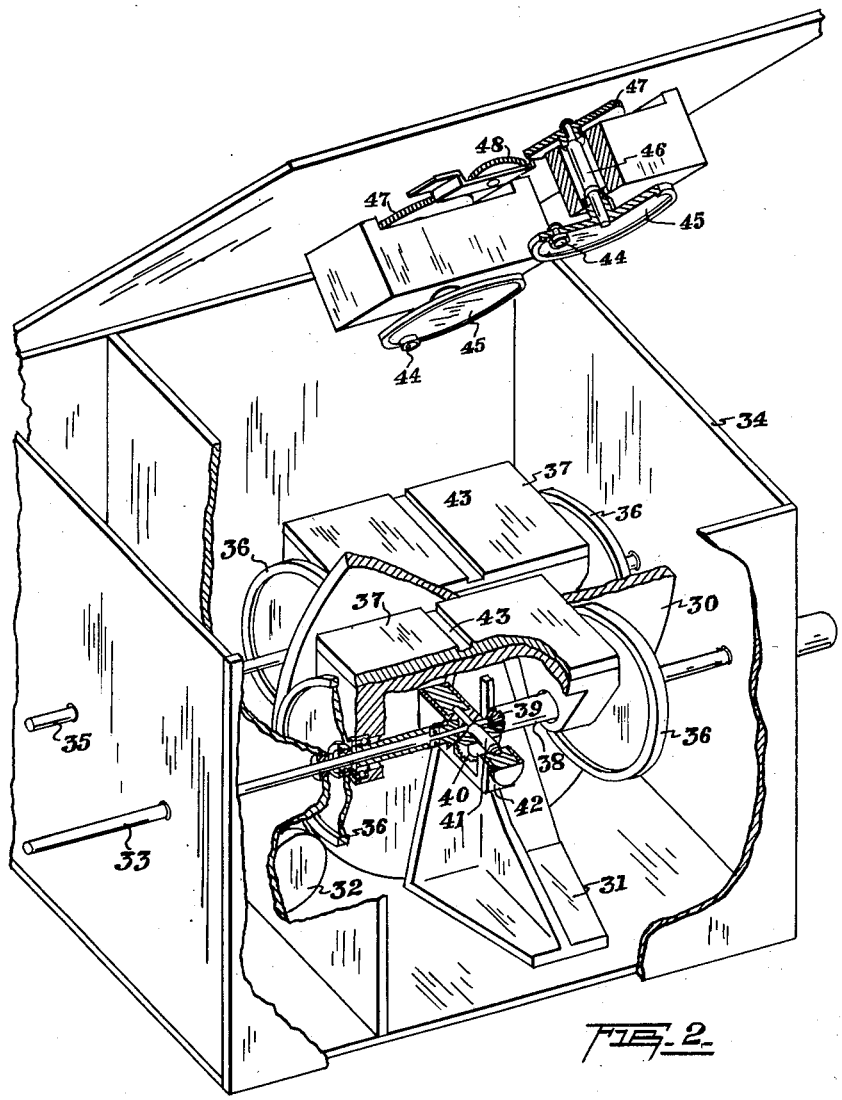
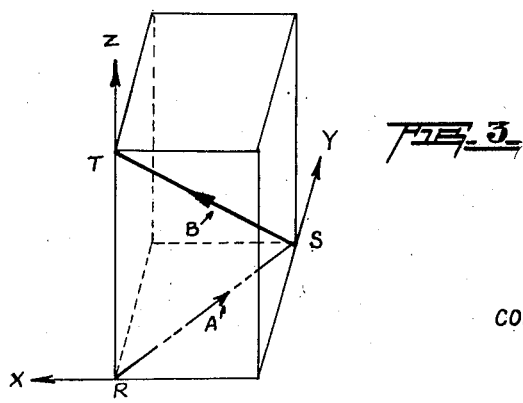
INVENTORS
THEODORE J. BLACHUT
CORNELIS J. VAN DER HOEVEN
BY *Smart & Biggar*
ATTORNEYS July 2, 1957  T. J. BLACHUT ET AL  2,797,579
MANUALLY OPERABLE APPARATUS FOR STEERING AN OBJECT
Filed Jan. 11, 1954  5 Sheets-Sheet 3
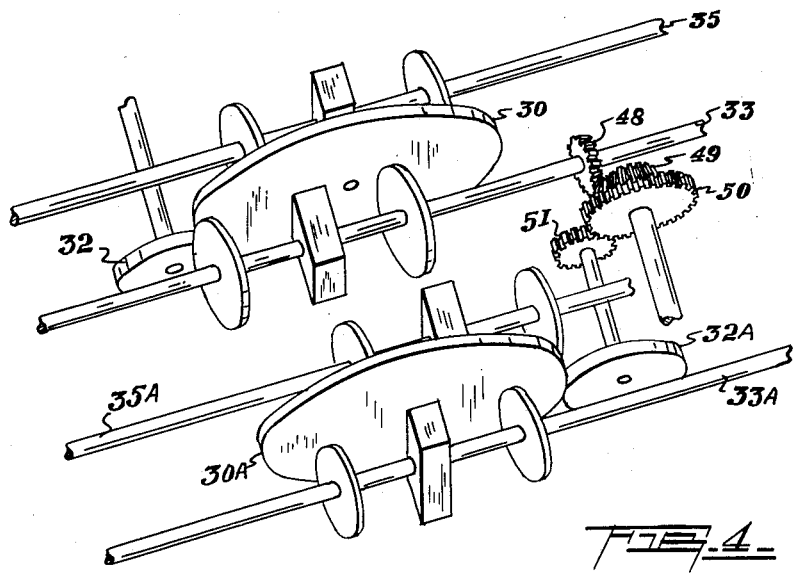
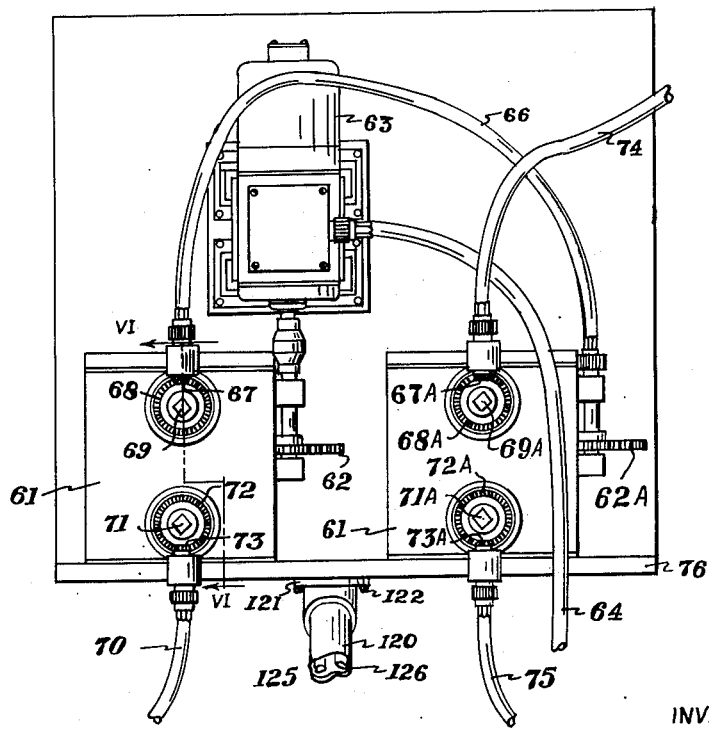
INVENTORS
THEODORE J. BLACHUT
CORNELIS. J. VAN DER HOEVEN
BY Smart & Biggar
ATTORNEYS

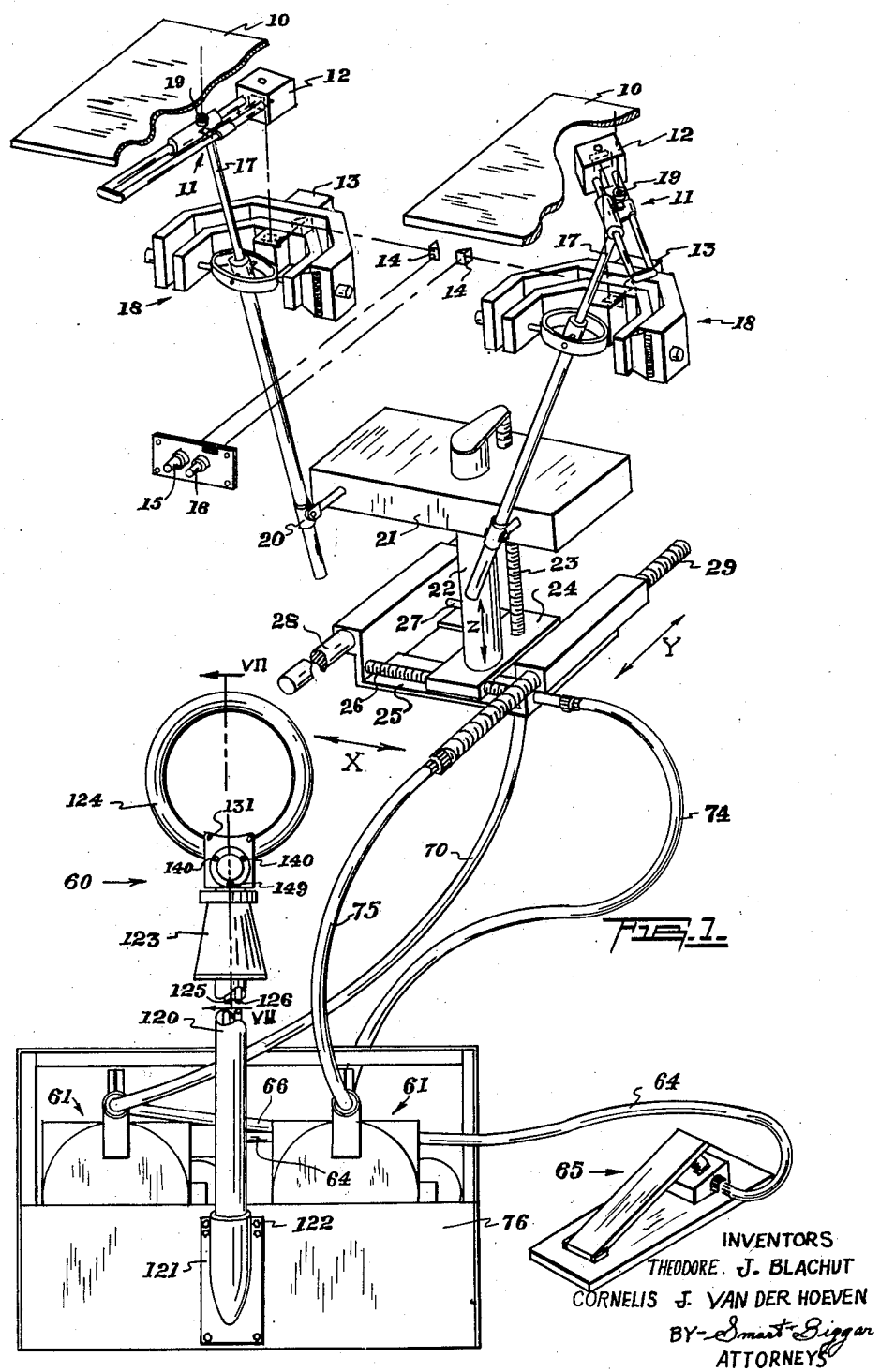

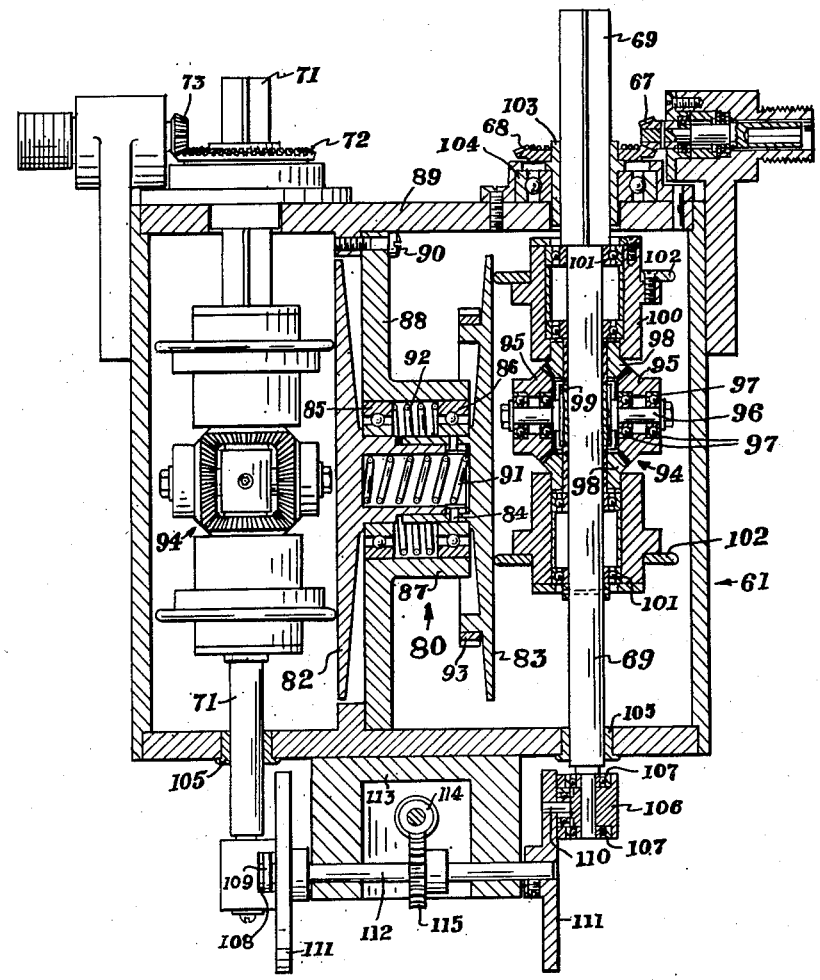
Fig-6-

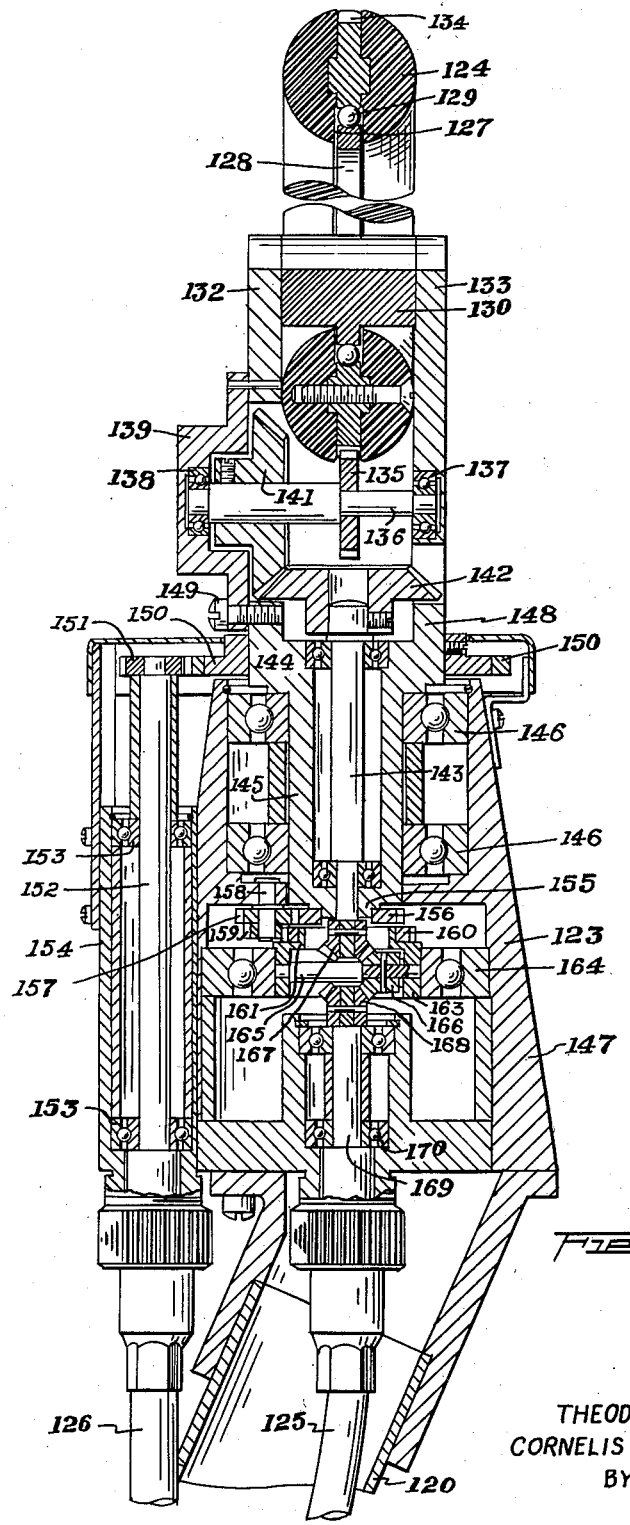

United States Patent Office 2,797,579
Patented July 2, 1957

2,797,579

MANUALLY OPERABLE APPARATUS FOR STEERING AN OBJECT

Theodore Josef Blachut and Cornelis Jan van der Hoeven, Ottawa, Ontario, Canada, assignors to National Research Council, Ottawa, Ontario, Canada Application January 11, 1954, Serial No. 403,346

10 Claims. (Cl. 74—1)

This invention relates to manually operable steering apparatus for apparatus of the type in which an object is moved within a field in at least one of two planes at right angles to each other according to the cooperation of means of conveyance, herein referred to as carriages, movable at right angles to each other whereby the object is moved along a path depending on the relative speeds of movement of the carriages. The term "object" as used herein includes two or more objects moved in unison and viewed as one, e. g. two objects seen as one through an optical system, or two objects aligned in the line of sight.

In the known apparatus for so moving an object, it is necessary to operate separate controls to produce the desired movement within the field with the result that accurate movement of the object is very difficult and results in great strain on the operator of the apparatus. It will be seen that a movement along a path which bisects the angle between the directions of movement of two carriages is the simplest movement, but in order that a straight line may be traversed along this path, it is necessary that the operator exactly co-ordinate the speeds of movement of the carriages. When the path to be traversed does not exactly bisect the angle, the speeds of movement of the two carriages must be kept at a ratio which is constant so long as it is desired that the path traversed extend in a straight line. When it is desired that the path curve, the problem of the operator in varying the ratio between the speeds of movement to obtain a regular curve is very much complicated. When, in addition, movement in three dimensions is involved so that it is desired to move an object within each of two fields, one in the horizontal plane and the other in the vertical plane, accurate co-ordination by a single operator of the three separate controls required is very difficult and it is attended by a high degree of strain. In the case of apparatus for following the flight of an aircraft, no attempt has been made due to the speeds involved to co-ordinate the three dimensional movements involved. In other cases, such, for example, as photogrammetric plotting, it is common to provide two hand controls, e. g. hand wheels, for the two movements in a horizontal plane and a foot control for vertical movement.

The object of the invention is therefore to provide manually operable steering apparatus for apparatus of the type described for moving an object, whereby the object which may be the plotting mark or the plotting pencil of a photogrammetric plotter may be set on a desired course which it then follows at a uniform speed.

A further object of the invention is to provide manually operable steering apparatus for steering an object movable three dimensionally in accordance with the cooperation of three carriages, whereby the object may be set on a desired three dimensional course which it then follows at a uniform speed.

A further object of the invention is to provide such apparatus in which the object is steered by the movement of one steering member whether the object is moved in one plane or two planes.

Other objects and features of the invention will appear from the following description of embodiments thereof with reference to the accompanying drawings in which:

Figure 1 shows steering apparatus according to the invention connected to steer the floating plotting marks and associated plotting pencil of a known photogrammetric plotter illustrated schematically;

Figure 2 is a schematic representation of an embodiment of the invention for steering an object in one plane;

Figure 3 is a diagram illustrating the movements involved in effecting three dimensional movement of an object;

Figure 4 is a schematic representation of the coupling of two coordinating units of the type illustrated in Figure 2 for effecting the three dimensional movement indicated in Figure 3;

Figure 5 is a plan view of the steering apparatus illustrated in Figure 1, the steering column and ring or wheel being broken away;

Figure 6 is a sectional view of one of the coordinating units shown in Figure 5, the section being taken on the line VI—VI of Figure 5; and Figure 7 is an enlarged sectional view of the unified manual control device for the two coordinating units shown in Figure 5, the section being taken on the line VII—VII of Figure 1.

In a photogrammetric plotter of the type illustrated schematically in Figure 1, each of two photographs orientated on a picture carrier 10 can be scanned by a lens unit 11 forming part of an optical system including prism units 12, 13 and 14, the two optical systems being coupled for stereoscopic viewing of the two photographs through the eye pieces 15 and 16.

Each lens unit 11 is mounted at the end of a guide rod 17 pivotally mounted between its ends in a gimbal ring unit 18 whereby the lens unit 11 including the usual floating mark 19 may be moved over the picture so that the floating mark follows a desired path on the picture and may at the same time be made to appear to move vertically in the stereoscopic picture so that full spatial control of the floating mark is obtained.

Each of the guide rods 17 is slidably engaged by a sleeve 20 pivotally connected to a carriage 21 adapted to be moved vertically on a guide post 22 on rotation of threaded shaft 23 operatively engaging a correspondingly threaded bore in carriage 21. The guide post 22 is rigidly mounted on a carriage 24 supported for movement from side to side of carriage 25 on rotation of threaded shaft 26, cooperating with a correspondingly threaded bore in carriage 24, the threaded shaft 26 supporting one end of the carriage 24 and the other end being supported on guide bar 27. Carriage 25 is in turn mounted on guide bar 28 and threaded shaft 29 whereby on rotation of the threaded shaft 29 cooperating with a threaded bore in carriage 25 the carriage 25 is movable endwise of the bar 28 and shaft 29. On simultaneous rotation of the shafts 29, 26 and 23, the carriage 21 may be simultaneously moved in the transverse direction X, in the front to back direction Y and in the vertical direction Z, X and Y directions being at right angles to each other in the same plane and the Z direction being at right angles to the plane of X and Y, so that carriages 21, 24 and 25 travel at right angles to each other.

A photogrammetric plotter as for instance indicated in Figure 1 is normally connected to a drawing table also provided with two carriages movable in the horizontal plane at right angles to each other and carrying a plotting pencil for tracing the movements of the floating marks 19 on coupling one carriage for movement in accordance with the X direction movement of carriage 24, and coupling the other carriage for movement in accordance with the Y direction movement of carriage 15.

A line followed by the floating marks 19 on the stereoscopically viewed pictures orientated on the picture carriers 10 may thus be drawn on the drawing table. Changes in apparent elevation of the image of the floating marks are necessary but there is of course need only for two dimensional movement on the drawing table in the X and Y directions.

It will be understood that carriage 24 in Figure 1 constitutes what may for convenience be referred to as the X carriage because it effects the movement of the object (the single image of the floating marks 19, or a plotting pencil) in the X direction, and similarly carriage 25 is the Y carriage and carriage 21 is the Z carriage. If the X and Y carriages 24 and 25 are moved at the same speed the guide post 22 and thus the object steered will be moved along a path exactly bisecting the right angle between the directions X and Y. If, however, the carriage 24 is moved faster than carriage 25, the angle between the X direction and the path followed by the object steered is smaller than the angle between such path and the Y direction.

Referring now to Figure 2, there is illustrated schematically apparatus according to the invention for steering an object along a desired path within a rectangular field in one plane by adjusting in sine-cosine relationship the relative speeds of movement of X and Y carriages by means such as threaded shafts 26 and 29 in Figure 1. A flat disc 30 is mounted for rotation on a shaft (not shown) journalled in brackets 31 and is driven by frictional engagement with a wheel 32 connected to motor means (not shown). An output shaft 33 is journalled in casing 34 on one side of disc 30, and an output shaft 35 is similarly journalled on the other side of disc 30, one of the output shafts being adapted for connection to drive means for moving the X carriage while the other output shaft is connected to move the Y carriage. Each face of the disc 30 is frictionally engaged by two wheels 36 interconnected by means of a bridge 37 to shift the two wheels on one side of the disc 30 as a unit longitudinally of the output shafts 33 and 35. Each of the output shafts 33 and 35 passes through the axis of rotation of the disc 30 and accordingly the wheels 36 move radially of the disc 30 as they are moved endwise of the respective output shaft by means engaging the associated bridge 37. As any one of the wheels 36 is moved radially outwardly of the disc it is driven faster and conversely the other wheel of the same unit is accordingly moved radially inwardly, and therefore is driven proportionately more slowly. Each wheel 36 is keyed to a sleeve 38 carrying at its inner end a pinion 39 in engagement with a crown gear 40 rotatably mounted on a shaft 41 secured to the output shaft 33 or 35 to rotate therewith. The crown gear 40 is conveniently enclosed in housing 42 adapted to rotate with shaft 41.

When the two wheels 36 on one side of the disc 30 are evenly spaced on either side of the axis of rotation of the disc 30, the two wheels 36 are driven by the disc 30 at exactly the same speed but in opposite senses. Accordingly the pinions 39 are so driven and they co-operate to turn the crown gear 40 on shaft 41. As soon, however, as there is any difference in speed between the wheels 36 on one side of the disc (and therefore between the pinion 39 driven thereby), the gear 40 is caused to walk around the pinion 39 which (of the two) is driven slower. The shaft 41 accordingly drives the respective output shaft at a speed which is equal to half the difference between the speeds of rotation of the pinions 39 and thus the wheels 36. The direction of rotation of either output shaft is governed by the side of dead centre (i. e. the axis of rotation) of the disc 30 to which the bridge 37 is moved, and the speed in either direction of either output shaft is governed by the distance beyond dead centre to which the bridge 37 and thus the wheels 36 are moved.

In order to drive X and Y carriages at speeds co-ordinated to steer an object carried by the carriages along a desired path at a uniform speed, the speeds of the output shafts 33 and 35 should be adjusted in sine-cosine relationship and this is accomplished in the apparatus according to Figure 2 by shifting the bridges 37 in sine-cosine relationship. Each bridge is provided with a transverse slot 43 adapted to receive a roller 44 rotatably mounted adjacent the periphery of each of two wheels 45. Each of the wheels 45 is connected at one end of a shaft 46 the other end of which carries a gear 47, the two gears 47 meshing with a gear 48 connected to be rotated by suitable hand operated means (not shown). The rollers 44 are positioned at a phase difference of 90° in the plane of the wheels 45 so that on rotation of the gear 48 the rollers 44 shift the bridges 37 in sine-cosine relationship and co-ordinate the speeds of the output shafts 33 and 35 accordingly.

Considering the apparatus of Figure 2 as connected to drive the threaded shafts 26 and 29 of Figure 1, the speeds of rotation of the two shafts 26 and 29 are automatically co-ordinated to steer the guide post 22 and thus the image of the floating marks 19 steadily along a path depending on the setting of the gear 48. Rotation of the gear 48 in one direction will set the guide post on a new path to one side of the original and rotation of the gear 48 in the other direction will set the guide post on a new path on the opposite side of the original, the path depending on the extent of rotation of the gear 48. Thus the image of the floating marks may be steered by the manual means for turning the gear 48, the image holding the course set by the gear 48 so long as the gear 48 is not turned by said manual means. Thus the image is steered as are the wheels of a motor car, and the manual means for turning gear 48 may be the same as or similar to the steering wheel of a motor car. The speed of movement of the image of the floating marks may be varied by means (which may resemble the accelerator of a motor car) controlling the speed of the motor driving the wheel 32.

It will be noted that the speed of rotation of the output shafts 33 and 35 is very small in relation to the speed at which the disc 30 is driven. Accordingly the torque transmitted by the output shafts is high.

Because the bridges 37 are shifted in sine-cosine relationship, one will be at the dead centre position when the other is at the extreme position on either side of dead centre so that one output shaft is stationary while the other is rotating at maximum speed. Thus two such units as are illustrated in Figure 2 may be coupled, as indicated schematically in Figure 4, to steer an object in two rectangular fields the planes of which are at right angles to each other. Considering Figure 3, the vertical movement Z is marked as well as the transverse movement X and front and back movement Y. If the starting point is taken as R and the carriages (which may be the carriages 24 and 25 of Figure 1) are driven at the same speed and no vertical movement is involved in the Z direction, the path followed will be that indicated by the letter A until the point S is reached. If then the object, e. g. the image of the floating marks 19, is moved to the point T directly above the point R, the path followed is B which involves exactly the same movement of carriages X and Y (in the reverse direction) plus a movement of the third component in the Z direction adjusted to the movements in the horizontal direction at such a ratio that for any given relationship between the distance RT and the horizontal movements of carriages X and Y, the speed of movement of the object remains constant.

Referring to Figure 4 the disc 30 of the first unit is driven by the wheel 32 and the disc 30A of the second unit is driven by the wheel 32A which, however, is driven, not from the controllable motor means, but from one of the output shafts e. g. shaft 33 of the first unit through gears 49, 50, 51 and 52. It will be seen that if the bridges 37, which for the sake of clarity are omitted in shaft 143, the stepped extension 148 being secured to cap 139 by screws 149.

An external ring gear 150 is secured to the periphery of the stepped extension 148 and meshes with a spur gear 151 keyed on the end of shaft 152 rotatably mounted in bearings 153 in casing 154 of the secondary transmission unit. Shaft 152 is connected to rotate flexible shaft 126 which is thus rotated when steering ring 124 is pivoted on the axis of shaft 143. Such pivoting carries with it plates 132 and 133, sleeve 145 and the spur gear 150, thus driving spur gear 151 and shaft 152.

Rotation of the steering ring 124 in its own plane rotates shaft 136 through bevel-gears 141 and 142 as described above. Shaft 143 is not directly connected to flexible shaft 125 because in that event swinging of the ring on the axis of the shaft 143 in order to drive shaft 152, also rotates shaft 143 in unison with sleeve 145. Accordingly shaft 143 is connected to flexible shaft 125 through means transmitting to shaft 125 only relative rotation between shaft 143 and sleeve 145. The end of sleeve 145 opposite the extension 148 is stepped to provide a portion 155 of reduced cross section on which is secured an external ring gear 156. Aligned with ring gear 156 is a spur gear 157 keyed to shaft 158 rotatably mounted in the casing 147 of the primary transmission unit. Spur gear 157 is keyed to shaft 158 to rotate the latter under the influence of ring gear 156 on rotation of sleeve 145. Shaft 158 also carries keyed thereto spur gear 159 aligned with an external ring gear 160 secured on a shoulder 161 of a ring 163 rotatably mounted in bearings 164 and carrying shaft 165 on which is rotatably mounted crown gear 166.

A pinion 167 is keyed to the end of shaft 143 and a pinion 168 is keyed to the end of shaft 169 rotatably mounted in bearings 170 and connected to flexible shaft 125. Both pinions 167 and 168 mesh with crown gear 166.

When the steering ring 124 is rotated in its own plane to drive shaft 143 in relation to sleeve 145, pinion 167 drives pinion 168 in the opposite direction through gear 166. When, however, the steering wheel 124 is swung on the axis of shaft 143 so that shaft 143 does not rotate in relation to sleeve 145 but rotates with it, gear 156 drives gear 157 and thus gear 159 drives gear 160 which causes the ring 163 to rotate with shaft 143 at the same speed so that crown gear 166 walks around pinion 168 and does not drive it.

It will be seen that either of flexible shafts 125 and 126 may be connected to the worm 114 of either of the two units 61 depending on which motion of the steering wheel it is desired should control vertical and which horizontal movement. In the embodiment illustrated it has been found preferable to control movement in the horizontal plane by the swinging movement of the steering wheel about the axis of the shaft 143, and accordingly flexible shaft 126 is connected to the worm 114 of the second unit 61A while flexible shaft 125 is connected to the worm 114 of the first unit 61, the flexible shaft 70 of which is connected to the Z carriage.

For convenience reference is made above to the paths or directions of movement of the carriages being "at right angles" to each other, and to variation of the speeds of the output shafts "in sine-cosine relationship" with consequent movement of the object "at a uniform speed." It will be understood, however, that the angles between the X, Y and Z directions may differ from 90° by several degrees depending on the particular application, and that likewise the means, such as the pins 110 involved in varying the shaft speeds in sine-cosine relationship, need not be set precisely at a phase difference of 90°. Such variations will affect the uniformity of the speed of the object steered, but whether the variation in uniformity of speed is significant depends on the extent of the variation, and on the particular application of the invention.

What we claim as our invention is:

1. Manually operable steering apparatus for steering an object movable in accordance with the movement of three carriages of which two have means for moving the same in relation to each other substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with movement of the third carriage; each of said coordinating units comprising a pair of rotatably mounted output shafts, rotatably mounted disc means, means for driving said output shafts from said disc means including means for varying the speed of rotation of each output shaft, and means for actuating said speed varying means substantially in sine-cosine relationship, the two output shafts of the first of said units being connected to drive said means for moving the first two carriages, one of the output shafts of the second unit being connected to drive said means for moving the third carriage, and the other output shaft of the second unit being connected to drive the disc means of the first unit; means for driving the disc means of the second unit; and a steering member adapted to operate in both coordinating units said means for actuating said speed varying means.

2. Manually operable steering apparatus for steering an object movable in accordance with the movement of three carriages of which two have means for moving the same in relation to each other back and forth substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit about the respective output shaft, shaft means extending transversely of each output shaft for rotation therewith and, rotatably mounted thereon, at least one crown gear in mesh with each of said driving pinions, and means for shifting the pair of wheel units mounted on each output shaft radially of said disc means substantially in sine-cosine relationship, the two output shafts of the first of said units being connected to drive said means for moving the first two carriages, one of the output shafts of the second unit being connected to drive the disc means of ing the third carriage and the other output shaft of the second units being connected to drive the disc means of the first unit; and means for driving the disc means of the second unit.

3. Manually operable steering apparatus for steering an object movable in accordance with the movement of three carriages of which two have means for moving the same in relation to each other back and forth substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit Figure 4, are shifted in the first unit so that the speed of rotation of the output shaft 33 driving the second unit is zero, the other output shaft 35 is driven at maximum speed and conversely if the output shaft 33 is rotated at maximum speed the other shaft 35 does not rotate. Accordingly the output shafts 33A and 35A of the second unit driven by shaft 33 of the first unit may be connected to the X and Y carriages whereas the output shaft 35 in the first unit is connected to drive the Z carriage. Thus if shaft 35 is driven at maximum speed the only movement is vertical, no drive being passed to the X and Y carriages. If on the other hand no vertical movement is desired, the output shaft 33 is shifted for maximum speed so that the total output of gear 32 of the first unit is transferred to the second unit, the speed of rotation of the output shaft 33 having been multiplied to drive the disc 30A at the required speed. If, however, none of the bridges 37 are at dead centre, the first unit allows a movement in one or other of the horizontal directions X and Y depending on the amount of vertical movement passed to the Z carriage by output shaft 34 of the first unit, the second unit then distributing to the X and Y carriages the rotational speed of shaft 33. Thus it will be seen that if, to take the simplest case, the object is to be steered from one corner of a cube to the diagonally opposite corner, so that the X, Y and Z components are moved the same distance, each of the bridges 37 will be shifted from dead centre by the same amount.

The embodiment of the invention shown in Figure 1, which includes a unified manual control device 60 for coordinating the pairs of bridges or equivalents of each unit, is illustrated in plan view in Figure 5. The two units 61 described below in detail with reference to Figure 6 are identical in construction. Each unit has a gear 62 corresponding to the wheel 32 of Figure 2. The gear 62 of one unit is driven by variable speed motor 63, the speed of which is controlled through cable 64 by a foot operated pedal 65 (Figure 1) which preferably resembles the accelerator pedal of a motor car. The gear 62A of the other unit 61 is driven through a flexible shaft 66 and bevel-gears 67 and 68 from output shaft 69 of the first unit 61. The Z carriage (which in Figure 1 is the carriage 21) is moved by the flexible shaft 70 connected to be driven by the output shaft 71 of the first unit 61 through bevel-gears 72 and 73. The output shafts 69A and 71A of the second unit are then connected to the X and Y carriages through flexible shafts 74 and 75 driven from the output shafts 69A and 71A through bevel-gears 67A and 68A and 72A and 73A respectively. In Figure 1 flexible shaft 74 is shown connected to rotate threaded shaft 26 to drive the carriage 24 in the X direction and flexible shaft 75 is connected to rotate threaded shaft 29 to drive carriage 25 in the Y direction. The two units 61 and motor 63 are mounted in casing 76.

The construction of each of the units 61 will now be described with reference to Figure 6. The disc unit 80 corresponding to the disc 30 of Figure 2 comprises two discs 82 and 83 keyed together for common rotation by pins 84 and rotatably mounted respectively in bearings 85 and 86 in hub 87 provided with a flange 88 peripherally secured to the casing 89 of the unit by suitable means such as screws 90. The discs 82 and 83 are axially movable in relation to each other and are urged apart by helical spring 91 to ensure adequate frictional engagement between the discs 82 and 83 and the wheels of the differential units referred to below. Corresponding shifting of the bearings 85 and 86 as the discs 82 and 83 may shift axially, is ensured by helical spring 92.

The inner face of disc 83 is provided with an integral ring gear 93 meshing with gear 62 (Figure 5).

At each side of the disc unit there is positioned a differential unit 94 cooperating with each of the output shafts 69 and 71 (Figure 5), journalled in casing 89 for rotation and reciprocating movement. Each differential unit 94 consists essentially of a pair of crown gears 95 rotatably mounted on shafts 96 in bearings 97, and a pair of pinions 98 rotatably mounted on the output shaft 69 or 71 and meshing with both crown gears 95. Shafts 96 project oppositely from sleeve 99 keyed to the output shaft and accordingly the sleeve 99 and shafts 96 and the output shaft rotate as a unit when the pinions 98 are rotated in opposite directions at different speeds. They are rotated by wheel units 100 rotatably mounted in bearings 101 and provided with disc engaging rims 102 preferably formed of rubber or the like.

The output shafts are each keyed in a sliding fit at the upper side of the casing 89, to a sleeve 103 rotatably mounted in a bearing 104 and carrying one of the bevel-gears 68, 72, respectively engaging with bevel-gears 67, 73. At the lower end of the casing the output shafts are rotatably mounted in bearings 105 and are each provided with a yoke member 106 rotatably mounted in bearings 107. Each yoke member is provided on one face with a slot 108 extending transversely to the length of the output shaft and adapted to receive a roller 109 carried on the end of a pin 110 mounted in a wheel 111. The two wheels 111 are mounted on a shaft 112 journalled in the two arms of bracket 113 and driven through worm 114 and worm gear 115. Pins 110 are set in the wheels 111 at a phase difference of 90°. As the shaft 112 is rotated the rollers riding in the slot 108 shift the respective yoke member 106 and thus its output shaft longitudinally, the two output shafts thus being shifted in sine-cosine relationship so that the wheel units 100 are so shifted. The output shafts pass through the axis of rotation of the discs 82 and 83 and accordingly the disc engaging rims 102 are shifted radially of the discs 82 and 83. When the two members 102 are spaced evenly on each side of dead centre (the axis of rotation of the discs 82 and 83) wheel units 100 rotate at the same speed driving the crown gears 95 in opposite directions but not rotating the output shafts. As described above with respect to Figure 2, however, a difference in rate of speed of the wheel units, effected on radial shifting of the wheel units, causes the crown gears 95 to walk around the pinions 98 thus rotating the output shafts at a speed equal to half the difference between the speeds of the pinions 98.

Each of the worms 114 is suitably supported by bearing means (not shown) and is driven by a flexible shaft rotated by the unified manual control device 60 described in detail with reference to Figure 7. The control device 60 consists essentially of a steering column 120 having a mounting plate 121 for attachment by means, for example, of bolts 122 to the front face of the casing 76 as illustrated in Figures 1 and 5, a transmission unit 123, a steering ring 124 and two flexible shafts 125 and 126 connected to the worms 114 of the units 61.

The steering ring 124 is formed with an inner peripheral groove 127 receiving a mounting ring 128 and ball bearings 129 so that the wheel 124 may be rotated in its own plane on the mounting ring 128. The mounting ring 128 is formed with an integral mounting block 130 secured for example by screws 131 (Figure 1) to plates 132 and 133 spaced as indicated in Figure 7 by the mounting block 130 so as to pass the steering ring therebetween.

The steering ring 124 is provided with an external ring gear 134 the teeth of which mesh with those of a spur gear 135 keyed to shaft 136 mounted in bearing 137 journalled in plate 133 and in bearing 138 journalled in cap 139 secured to plate 132 by screws 140 (Figure 1). Shaft 136 also has keyed thereto a bevel-gear 141 to be rotated by shaft 136 as spur gear 135 is driven on rotation of the steering ring 134 in its own plane. Bevel-gear 141 meshes with bevel-gear 142 keyed to shaft 143 mounted on bearings 144 in sleeve 145 which in turn is rotatably supported by bearings 146 in the casing 147 of the primary transmission unit. Sleeve 145 is provided with a stepped extension 148 aligned with plates 132 and 133 and secured thereto for rotation about the axis of about the respective output shaft, shaft means extending transversely of each output shaft for rotation therewith and, rotatably mounted thereon, at least one crown gear in mesh with each of said driving pinions, and means for shifting the pair of wheel units mounted on each output shaft radially of said disc means substantially in sine-cosine relationship, the two output shafts of the first of said units being connected to drive said means for moving the first two carriages, one of the output shafts of the second unit being connected to drive said means for moving the third carriage and the other output shaft of the second unit being connected to drive the disc means of the first unit; means for driving the disc means of the second unit; and a steering member adapted to actuate the means for shifting the pair of wheel units of both coordinating units.

4. Manually operable steering apparatus for steering an object movable in accordance with the movement of three carriages of which two have means for moving the same in relation to each other back and forth substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit about the respective output shaft, shaft means extending transversely of each output shaft for rotation therewith and, rotatably mounted thereon, at least one crown gear in mesh with each of said driving pinions, shift means for moving the pair of wheel units mounted on each output shaft radially of said disc means, a pair of driven wheel members connected at a phase difference of substantially 90° to said shift means, means for rotating said wheel members substantially in unison to actuate said shift means substantially in sine-cosine relationship, the two output shafts of the first of said units being connected to drive said means for moving the first two carriages, one of the output shafts of the second unit being connected to drive said means for moving the third carriage and the other output shaft of the second unit being connected to drive the disc means of the first unit; means for driving the disc means of the second unit; and a manually operable steering member adapted to actuate in each unit said means for rotating said wheel members in unison.

5. Manually operable steering apparatus for adjusting in sine-cosine relationship the speeds of movement of the three carriages of a photogrammetric plotter cooperating to move an object along a desired path, the plotter including separate means for moving two of said carriages substantially at right angles in the horizontal plane and means for moving the third carriage substantially vertically; comprising a coordinating unit adapted to coordinate substantially in sine-cosine relationship the speeds of movement of the two carriages in the horizontal plane; a coordinating unit for coordinating the resulting movement of the two carriages movable in the horizontal plane with the movement of the vertically movable carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit about the respective output shaft, shaft means extending transversely of each output shaft for rotation therewith and, rotatably mounted thereon, at least one crown gear in mesh with each of said driving pinions, shift means rotatably engaging each output shaft and adapted to move said shaft endwise, a pair of wheel members each connected at a phase difference of substantially 90° to one of said shift means, means for rotating said wheel members substantially in unison, the two output shafts of the first of said coordinating units being connected to drive said means for moving the two carriages movable in the horizontal plane, one of the output shafts of the second unit being connected to drive said means for moving the carriage movable vertically and the other output shaft of the second unit being connected to drive the disc means of the first unit; means for driving the disc means of the second unit; and manually operable means for actuating said means in each unit for rotating said wheel members in unison.

6. Manually operable steering apparatus for steering an object movable in accordance with the movement of three carriages of which two have means for moving the same in relation to each other back and forth substantially in the horizontal plane along paths extending substantially at right angles, and the other carriage has means for moving the same substantially vertically; comprising a coordinating unit adapted to coordinate the speeds of movement of the two carriages in the horizontal plane; a coordinating unit for coordinating the resulting movement of the two carriages movable in the horizontal plane with the movement of the vertically movable carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit about the respective output shaft, shaft means extending transversely of each output shaft for rotation therewith and, rotatably mounted thereon, at least one crown gear in mesh with each of said driving pinions, shift means for moving the pair of wheel units mounted on each output shaft radially of said disc means, a pair of driven wheel members each connected at a phase difference of substantially 90° to one of said shift means, means for rotating said wheel members substantially in unison to actuate said shift means substantially in sine-cosine relationship, the two output shafts of the first of said units being connected to drive said means for moving the two carriages movable in the horizontal plane, one of the output shafts of the second unit being connected to drive said means for moving the carriage movable vertically and the other output shaft of the second unit being connected to drive the disc means of the first unit; means for driving the disc means of the second unit; and a manually operable steering member adapted to transmit two movements thereof independently to said means in each unit for rotating said wheel members substantially in unison.

7. Manually operable steering apparatus for adjusting in sine-cosine relationship the speeds of movement of the three carriages of a photogrammetric plotter cooperating to move an object along a desired path, the plotter including separate means for moving two of said carriages substantially at right angles in the horizontal plane and means for moving the third carriage substantially vertically; comprising a coordinating unit adapted to coordinate in sine-cosine relationship the speeds of movement of the two carriages in the horizontal plane; a coordinating unit for coordinating the resulting movement of the two carriages movable in the horizontal plane with the movement of the vertically movable carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit including a driving pinion rotatable with said wheel unit about the respective output shaft, shaft means extending transversely of each output shaft for rotation therewith and, rotatably mounted thereon, at least one crown gear in mesh with each of said driving pinions, shift means rotatably engaging each output shaft and adapted to move said shaft endwise, a pair of wheel members each connected at a phase difference of substantially 90° to one of said shift means, means for rotating said wheel members substantially in unison, the two output shafts of the first of said coordinating units being connected to drive said means for moving the two carriages movable in the horizontal plane, one of the output shafts of the second unit being connected to drive said means for moving the carriage movable vertically and the other output shaft of the second unit being connected to drive the disc means of the first unit; means for driving the disc means of the second unit; and a manually operable steering member capable of two movements and adapted to transmit the same independently to said means in each unit for rotating said wheel members substantially in unison.

8. Manually operable steering apparatus for steering an object movable in accordance with the movement of three carriages of which two have means for moving the same in relation to each other substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising a pair of rotatably mounted output shafts, means for driving said output shafts including means for varying the speed of rotation of each output shaft, and means for actuating said speed varying means substantially in sine-cosine relationship, the two output shafts of the first of said units being connected to drive said means for moving the first two carriages, one of the output shafts of the second unit being connected to drive said means for moving the third carriage, and the other output shaft of the second unit being connected to drive the drive means of the first unit; means for driving the drive means of the second unit; and a steering member adapted to operate in both coordinating units said means for actuating said speed varying means.

9. Manually operable steering apparatus for steering an object movable in accordance with the movement of three carriages of which two have means for moving the same in relation to each other back and forth substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit engaging the disc means on one side of the axis of rotation of the disc means, differential gearing in connection with each pair of wheel units adapted to drive the output shaft on which that pair of wheel units is rotatably mounted at a speed equal to a proportion of the difference between the speeds of rotation of the pair of wheel units and in a direction depending on which wheel unit of the pair is rotated faster, and means for effecting relative shifting of the two pairs of wheel units radially across said face of the disc means substantially in sine-cosine relationship, the two output shafts of the first of said units being connected to drive said means for moving the first two carriages, one of the output shafts of the second unit being connected to drive said means for moving the third carriage and the other output shaft of the second unit being connected to drive the disc means of the first unit; and means for driving the disc means of the second unit.

10. Manually operable steering apparatus for steering an object movable in accordance with the movement of three carriages of which two have means for moving the same in relation to each other back and forth substantially in one plane along paths extending substantially at right angles, and the third carriage has means for moving the same substantially at right angles to the first plane; comprising a coordinating unit adapted to coordinate the speeds of movement of the first two carriages; a coordinating unit for coordinating the resulting movement of the first two carriages with the movement of the third carriage; each of said coordinating units comprising rotatably mounted disc means, a pair of rotatably mounted output shafts, a pair of wheel units rotatably mounted on each of said output shafts with said wheel units in driving engagement with a face of said disc means, each wheel unit engaging the disc means on one side of the axis of rotation of the disc means, differential gearing in connection with each pair of wheel units adapted to drive the output shaft on which that pair of wheel units is rotatably mounted at a speed equal to a proportion of the difference between the speeds of rotation of the pair of wheel units and in a direction depending on which wheel unit of the pair is rotated faster, and means for effecting relative shifting of the two pairs of wheel units radially across said face of the disc means substantially in sine-cosine relationship, the two output shafts of the first of said units being connected to drive said means for moving the first two carriages, one of the output shafts of the second unit being connected to drive said means for moving the third carriage and the other output shaft of the second unit being connected to drive the disc means of the first unit; means for driving the disc means of the second unit; and a steering member adapted to transmit two movements separately to actuate said means of each coordinating unit for shifting the pair of wheel units thereof.

References Cited in the file of this patent

UNITED STATES PATENTS

| 2,118,081 | Grisdale | May 24, 1938 |
| 2,402,027 | Crowther | June 11, 1946 |
| 2,558,425 | Droz | June 26, 1951 |